W. LANGE.
SAFETY VALVE.
APPLICATION FILED FEB. 18, 1915.
1,162,935.
Patented Dec. 7, 1915.
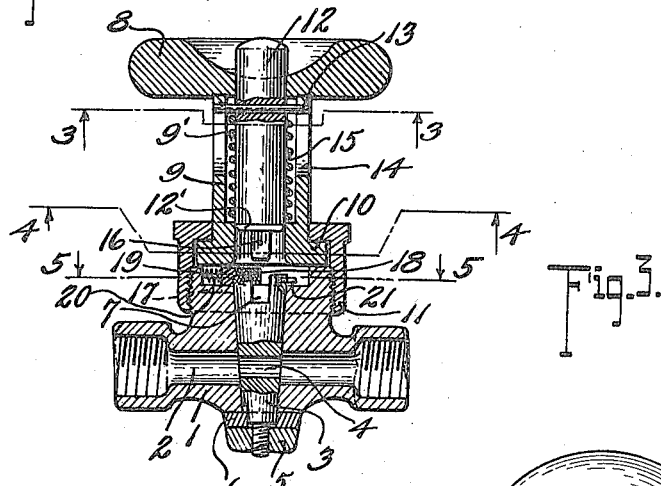
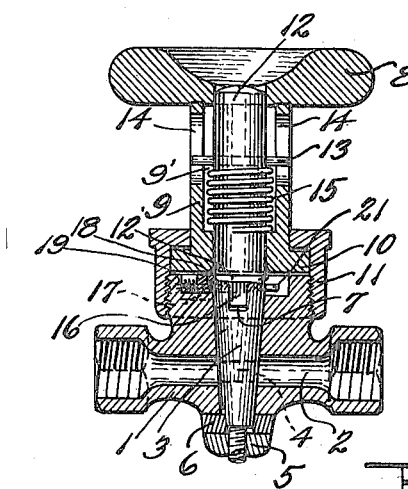
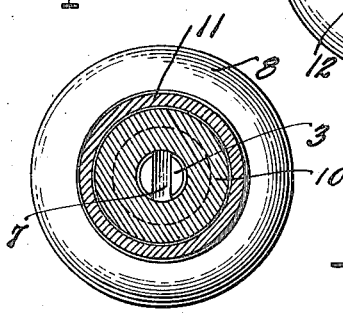
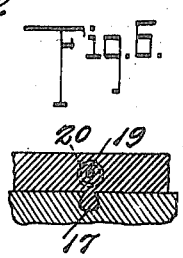
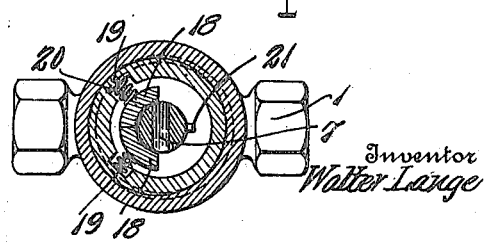
Inventor
Walter Lange

UNITED STATES PATENT OFFICE.

WALTER LANGE, OF BIG CREEK, NEBRASKA.

SAFETY-VALVE.

1,162,935. Specification of Letters Patent. Patented Dec. 7, 1915.

Application filed February 18, 1915. Serial No. 9,090.

*To all whom it may concern:*

Be it known that I, WALTER LANGE, a subject of the King of Denmark, residing at Big Creek, in the county of Cherry and State of Nebraska, have invented certain new and useful Improvements in Safety-Valves, of which the following is a specification.

The present invention relates to improvements in safety valves or cocks designed to control the flow of gas or other fluids, the essence of the invention lying in the provision of operating means for the valve plug which is normally maintained disconnected to prevent accidental opening thereof, said means including a key member having interlocking engagement with a rotatable handle and independent longitudinal movement for connecting said handle to the plug for operating the latter at will.

A further object in view is to provide a friction member coacting with the plug of the valve to prevent too free action thereof as well as firmly hold said plug at its adjusted position when once set by the operating means, the latter coöperating with the friction means to disengage it from the plug in the operation of rotating the same.

A still further object of my device is to utilize the friction member hereinbefore mentioned to positively limit rotation of the valve plug, the latter having a stop member adapted to impinge the friction member for this purpose.

With the above and such other objects as may hereinafter appear this invention consists of certain novel constructions, combinations and arrangements of parts as will be hereinafter specifically described and claimed.

Reference will now be had to the accompanying drawing forming a part of this specification, wherein:—

Figure 1 is a sectional view through a safety valve forming an embodiment of my invention, and showing the operating means in inoperative position with respect to the valve plug. Fig. 2 is a similar view to that of Fig. 1 with the operating means in connection with the plug for rotation thereof. Figs. 3, 4 and 5 are horizontal sections taken upon the respective planes indicated by the lines 3—3, 4—4, and 5—5 of Fig. 1. Fig. 6 is a sectional view taken through the friction element coöperating with the plug of the valve and showing more clearly the mounting of said friction member in the valve body.

Throughout the following detail description, and on the several figures of the drawing, similar parts are referred to by like reference characters.

The valve of my invention consists of the body 1 which is of conventional form and provided with the usual fluid passage 2 passing therethrough and having the usual type of conical plug 3 disposed therein formed with a transverse passage 4 for controlling the flow of the fluid through the said passage 2. The plug 3 is held in place by means of the nut 5 screwed upon its lower threaded extremity, a lock washer 6 lying intermediate said nut and the body 1 of the valve. The upper extremity of the plug or cut-off 3 is formed with a transverse groove 7 to receive a key member for rotating the plug as will hereinafter be more clearly described.

The operating means for the plug 3 consists of the handle or wheel 8 having a hollow stem 9 which is flanged at its lower extremity as indicated at 10 and seated upon the upper surface of the body 1, said handle member being connected to the body by means of the gland nut 11 having threaded connection with the similarly threaded portion of the body 1. It will be obvious that the handle 8 is freely rotative and under normal conditions is maintained inoperative with respect to the valve plug through the instrumentality of my special form of key member which consists of a plunger 12 extending longitudinally through the handle 8 and its stem 9, said plunger being locked for rotation with the handle in either its operative or inoperative position with respect to the plug by means of a locking pin 13 which passes transversely through the plunger and extends into diametrically opposite slots 14 in the stem 9 of said handle member. The stem 9 is formed with an enlarged recess 9′ and in said recess is seated a spring 15 normally holding the key member or plunger 12 in its uppermost position and disconnected from the valve plug 3 hereinbefore described. The pin 13 coacting with the slots 14 limits the longitudinal movement of the plunger 12 which is of sufficient length to extend through the handle or wheel 18 for convenience of access in operating the valve, as will be later described. The lower extremity of the plunger 12 is provided with a projection 16 which is adapted to be received in the groove 7 of the plug 3 when the plunger 12 is depressed against the expansive spring 15 for the purpose of connecting the handle member with the plug 3 for rotation thereof. Obviously under normal conditions the operating means above described is freely rotative so that it is impracticable to accidentally rotate the valve plug under normal conditions. This is especially advantageous to prevent likelihood of children tampering with the valve device.

It is, of course, desirous that the plug 3 be operable in its seat as easily as possible without binding action, and by my special arrangement it may readily be very loosely connected to the body by the nut 5, since I provide a friction member or members to coact with the plug as will now be described.

In an annular recess 17 is seated a semi-circular friction brake 18, most clearly shown in Fig. 5 of the drawing, and this brake 18 may consist of a pair of segmental shoes which are provided with pins 19 extending laterally therefrom and having seated thereupon springs 20 normally holding the shoe segments against the upper extremity of the plug 3. It is desirable that the contacting surface of the shoes be roughed or serrated so as to create sufficient friction to hold the plug at adjusted positions or prevent too free action thereof in manipulating the same. The shoe or friction member 18, broadly speaking, slightly overhangs the upper end of the plug for a purpose to be hereinafter mentioned.

As shown in Figs. 1 and 2, the lower end portion of the plunger 12 is beveled at 12' and when it is desired to rotate the plug 3, longitudinal movement of said plunger will bring the beveled end thereof into contact with the friction element 18 causing said element to be retracted from the plug as the plunger projection 16 enters the groove 7 for connecting the key member or plunger 12 with said plug. The rotation of the latter is, therefore, made easy and binding in its seat is thereby prevented. To limit the rotative movement of the plug 3, I provide the upper end thereof with a pin projection 21 and this member is adapted to impinge against the extremities of the friction member 18 when rotated in either direction. Thus the friction member performs a dual function and advantageously prevents likelihood of the plug being turned more than desired.

Fig. 6 shows more clearly the method of seating the friction elements in the recess 17 of the body, it being desirable to form the bottom of said recess with a groove in which the projection on the bottom of the friction segments is adapted to move to insure against displacement of the friction elements.

The operation of the device will be clear from the foregoing description and it may be briefly stated that to open the valve it is only necessary to depress the plunger 12 and simultaneously rotate the handle 8 for the purpose of rotating the valve plug 3 and incidentally connecting said valve to the handle member. Upon release of the plunger 12 the handle member is rendered inoperative with respect to the plug which is held in proper position by the friction elements coacting therewith.

It will be apparent that slight changes may readily be made in the details of construction and configuration of my device without departing from the spirit of the invention and within the scope of the appended claims.

Having thus described my invention, what I claim as new is:

1. A safety valve of the class described comprising a body, a rotative plug therein, manually operable means for rotating the plug normally disconnected therefrom, means intermediate the manual means and the plug for connecting the former to the latter, and locking means locking the connecting means for rotation with the manually operable means, said intermediate means being normally disconnected from the plug.

2. A safety valve of the class described comprising a body, a rotative plug therein, a handle for rotating the plug normally disconnected therefrom and freely rotatable, means on the handle movable longitudinally thereof for connection with the plug whereby the latter may be rotated upon rotation of the handle, and a locking member locking the connecting means for rotation with the handle, said locking member having slidable interlocking connection with the handle to permit longitudinal movement of said member in engaging the plug and maintaining interlocking connection with the handle.

3. A safety valve of the class described comprising a body, a rotative plug therein, a handle for rotating the plug normally disconnected therefrom, a plunger carried by said handle and adapted to connect the handle with the plug for rotation of the latter, a transverse locking member normally locking said plunger for rotation with the handle, and spring means coacting with the plunger to hold the latter disengaged from the plug.

4. A safety valve of the class described comprising a body, a rotative plug therein, a handle for rotating the plug disposed adjacent thereto and having a hollow stem formed with lateral slots, a plunger slidably mounted in the handle and adapted to engage the plug for rotation thereof by the handle, a pin carried by the plunger and extending into the slots of the handle for locking said plunger for rotation with the handle at all times, and a spring seated in the handle and normally holding the plunger disengaged from the plug.

5. A safety valve of the class described comprising a body, a rotative plug therein, means for rotating the plug and normally inoperative with respect thereto, friction means coacting with the plug for holding the latter at adjusted positions, and means for connecting the rotating means to the plug and arranged to coöperate with the friction means aforesaid to render the latter inoperative during rotation of said plug.

6. A safety plug of the class described comprising a body, a rotative plug therein, a handle for rotating the plug, a friction member coacting with the plug to hold the latter at adjusted positions, and a plunger connected with the handle and adapted to be moved into interlocking relation with the plug, said friction member lying in the path of movement of the plunger and adapted to be disengaged from the plug thereby upon movement connecting the handle with the plug.

7. A safety plug of the class described comprising a body, a rotative plug therein, an operating key for rotating the plug normally disposed in spaced relation thereto, and a friction member intermediate the key and the plug and coöperating with the said plug for retarding and holding it at adjusted positions, said friction member being adapted for disengagement upon movement connecting the key with the plug.

8. A safety valve of the class described comprising a body, a rotative plug therein, a spring retracted key, a spring actuated brake shoe coacting with the plug to hold the same at adjusted positions, and means for rotating said key upon interlocking the same with the plug for rotating the latter, said key coacting with the brake shoe aforesaid to render the same inoperative with respect to the plug when the key is connected thereto.

9. A safety plug of the class described comprising a body, a rotative plug therein, an operating key for rotating the plug normally disposed in spaced relation thereto, and a friction member intermediate the key and the plug and coöperating with the said plug for retarding and holding it at adjusted positions, said friction member being adapted for disengagement upon movement connecting the key with the plug, said friction member coöperating also with the plug to limit rotation thereof.

10. A safety valve of the class described comprising a body, a rotative plug seated therein, operating means for rotating said plug comprising a handle formed with a slotted stem, a spring actuated plunger carried by said handle, a locking pin extending through the plunger and into the slots aforesaid for locking the plunger for rotation with the handle, said plunger being normally held disconnected from the plug and adapted to be moved into coöperation therewith for rotating said plug upon rotation of the handle, brake means coöperating with the plug and adapted to be rendered inoperative upon connection of the plunger with said plug, and stop means carried by the plug adapted to coact with the brake means to limit rotative movement of said plug.

In testimony whereof I affix my signature in presence of two witnesses.

WALTER LANGE.

Witnesses:
R. G. ROTH,
FRANK ETHAN, Sr.